INVENTOR.
LEO G. WELLER

July 16, 1963  L. G. WELLER  3,097,938
GAS-MATERIAL SEPARATOR

Filed Sept. 1, 1961  3 Sheets-Sheet 3

INVENTOR.
LEO G. WELLER
BY
ATTORNEYS

Patented July 16, 1963

3,097,938
GAS-MATERIAL SEPARATOR
Leo G. Weller, Catasauqua, Pa., assignor to Fuller Company, Catasauqua, Pa., a corporation of Delaware
Filed Sept. 1, 1961, Ser. No. 136,404
5 Claims. (Cl. 55—302)

The present invention relates to the separation of pollutants from gas streams, and is more particularly concerned with the removal of dust from gas streams by means of filter media and the periodic cleaning of the accumulated dust from the filter media by subjecting the filter media to back or reverse flushing with a clean gas.

Various complicated systems of back flushing dust collector filters with clean gas or clean air have been tried. However, the initial and operating power costs have been considerable, particularly in those units which use combinations of cams, springs, cranks, eccentrics, bearings, shafts, or large rotating members extending over a large radius to isolate sections of the filter media from the dusty gas stream and to supply the cleaning air. Many designs have used a considerable number of relatively small filter bags, and require compartmentation of a portion of the receiver to permit cleaning of selected filter sections.

In general, the present invention comprises a filter having a back-flush valve of a relatively small diameter, in relation to the diameter of the filter, and which simultaneously governs both the exhaust of clean gas from the filter and the supply of back-flushing gas to a selected section of the filter. The valve casing has a plurality of back-flush ports, each of which communicates individually with a filter compartment or filter section. An internal rotor has a back-flush supply chamber for communication individually and successively with the ports in the casing and with a supply of clean gas. The back-flush chamber communicates with the clean-gas supply by means of a plurality of relatively small, successively-registering slots or apertures to provide a series of preferably separate backflush impulses.

A better understanding of the invention may be derived from the following description and accompanying drawings in which.

Figure 1:
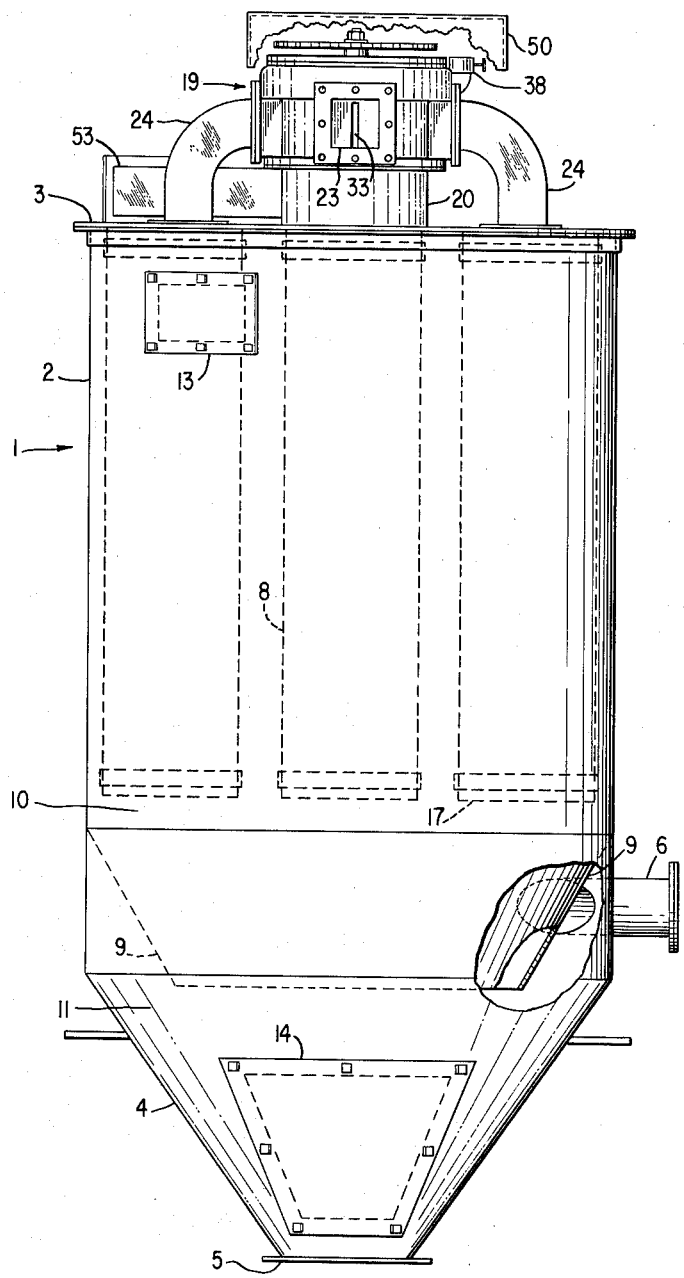
FIG. 1 is a side elevational view, partly broken away, and with one of the branch ducts removed, of a dust collector embodying the invention. In this figure one of the filter elements is shown on stream in a cleaning cycle, while another is shown in the process of being cleaned by reverse flow of clean air.
Figure 2:
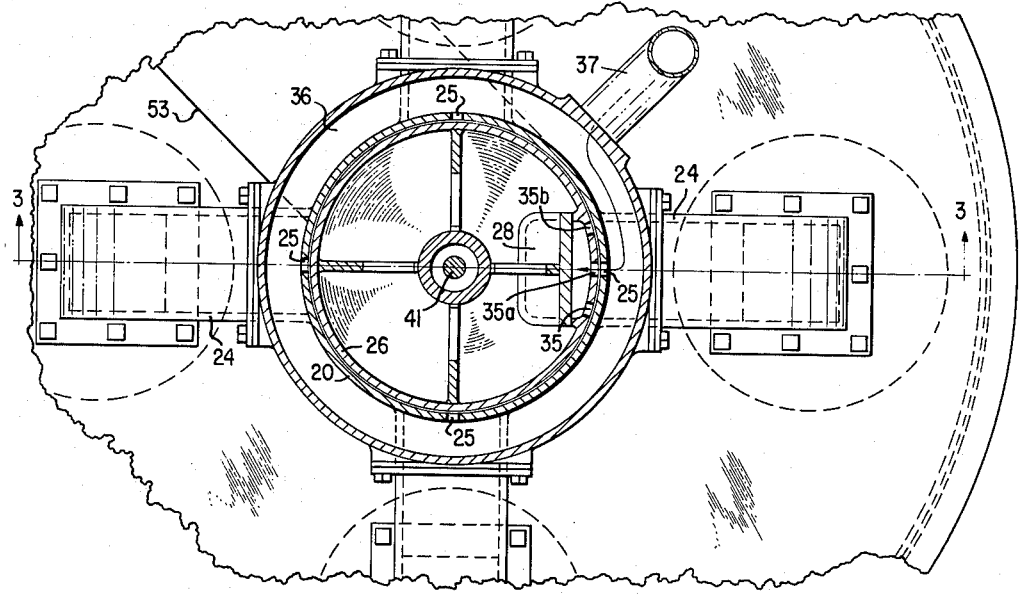
FIG. 2 is a horizontal sectional view taken along the lines 2—2 of FIG. 3.

As shown in the drawings, and as embodied in a dust collector forming a part of a receiver for a pneumatic conveying system, the receiver 1 comprises a casing 2 having a top wall 3 and conical bottom wall 4. The bottom wall 4 has a material outlet aperture 5 which may be closed by any suitable material-discharge means such as a rotary feeder, not shown. The lower portion of the casing receives a tangential material inlet 6, while the top wall 2 is provided with a plurality of clean gas outlets 7. A plurality of filter elements 8 are uniformly disposed about the center of the casing 2. The upper portion of the filter elements surround the respective outlets 7 and depend downwardly into the interior of the casing. Below the filter elements 8, and opposite the gas-material inlet 6, an inwardly-and-downwardly tapering skirt 9 is provided to divide the interior of the casing into an upper, filtering chamber 10 and a lower-primary-separating chamber 11 communicating with each other via the opening 12 at the lower end of the skirt.

Access openings 13 and 14 are provided in the casing to facilitate installation and replacement of the filter elements.

Filter elements 8 each comprises a flange 15 secured to the top wall 2 about the outlets 7, a tubular cage or screen 16 depending downwardly therefrom and terminating in a closing pan 17, and a filter sleeve 18 of a material such as quilted Orlon, woven fabric, or any other suitable material.

A valve 19 is centrally mounted on the top wall 2 and comprises a casing 20 which is closed at its lower end by the top wall 2 and at its upper end by a cover plate 21. The casing 20 has a rotor 22 therein. The casing 20 has a plurality of wide ports 23, corresponding in number to the number of filter elements 8. Each port 23 is individually connected to the outlets 7 of one of the filter elements by means of a branch duct 24. The casing 20 also has a corresponding number of delivery ports 25, individually aligned, vertically, above the centers of the ports 23.

The rotor 22 has a generally cylindrical portion 26 closed at its lower end by a substantially conical portion 27. A U-shaped delivery chamber 28 is located at one side of the periphery of the rotor. In order to establish communication between any port 23 and its associated upper port 25, the lower portion of the delivery chamber 28 has a port 33 therein in the same rotational plane as the casing ports 23, and the upper end of the delivery chamber 28 has a series of similar ports 35, 35a and 35b in the same rotational plane as the upper casing ports 25. The center rotor port 35a is axially aligned with the lower port 33, while ports 35 and 35b are spaced at opposite sides of port 35a so as to precede and follow it, respectively, during rotation of the rotor.

Preferably, the ports 35, 35a, 35b in the upper portion of the delivery chamber 28 are spaced apart a distance at least equal to their width. This spacing provides for several distinct, interrupted discharges or impulses of cleaning air through the ports, as hereinafter more fully described. Also, it is possible to use a different number of upper slots from the three shown.

The upper ports 25 in the valve casing each communicates with a common manifold 36. As shown, the manifold 36 forms a portion of the valve body or casing 20, but it is to be understood that the manifolding or supply function may be accomplished by any suitable piping arrangement. The manifold 36 has an intake pipe 37 having a valve 38 therein which communicates with a clean area of the surrounding atmosphere.

The rotor is mounted on a shaft 41 journaled in bearings 42 and 43 in a housing extension 44 of the cover plate 21. The cover plate 21 has a bleed port 45 providing limited, pressure-balancing communication between the isolated interior of the rotor and the surrounding atmosphere to prevent pressure-extrusion of the bearing grease in either direction. The rotor shaft 41 carries a sprocket 46 secured thereto by a key and a locknut assembly 47.

Figure 4:
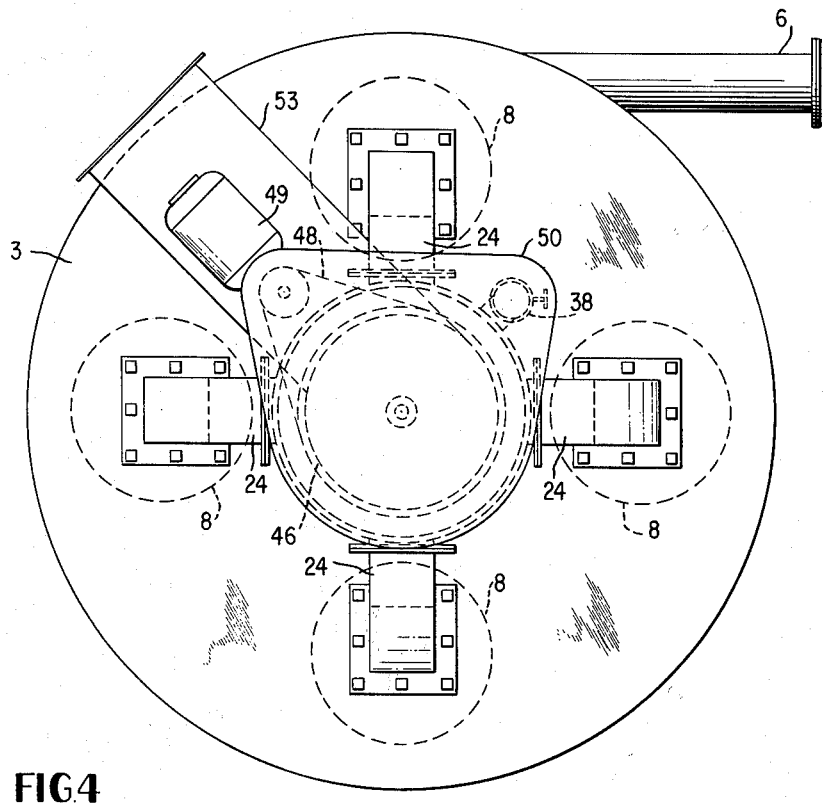
FIG. 4 is a plan view of the filter of FIG. 1.

The sprocket 46 is engaged by a chain 48 (FIG. 4) driven by a suitable gear motor 49. The gear motor is set up electrically with a limit switch so that after one or a predetermined number of revolutions, the limit switch will operate to cut off the supply of current to the motor and stop it. Initially the rotor 22 is indexed so that the ports 35, 35a and 35b thereof are positioned intermediate the casing ports 25. The speed of the motor is geared down so that the rotor is driven relatively slowly. The gearing places sufficient resistance in the motor drive that once the supply of power to the motor is cut off, the stoppage of rotation of the valve is substantially instantaneous. Thus after each period of operation, as hereinafter described, the valve will stop with the ports thereof intermediate the casing ports 25, thus assuring that the valve always will come to rest with the ports thereof not in alignment with the casing ports 25, so that all of the filter elements 8 will be connected in a cleaning cycle.

Where the filter is to be used for outdoor service, or it is desired for any reason, a shield or guard 50 is positioned over the sprocket, valve, chain drive or motor, and preferably overlies the intake opening of the intake valve 38.

The lower portion of the valve casing 20 has a clean gas outlet 52 therein in the region below the conical portion 27 of the valve rotor 22. The outlet 52 communicates with an exhaust conduit 53 leading to a blower or exhauster, not shown.

Figure 3:
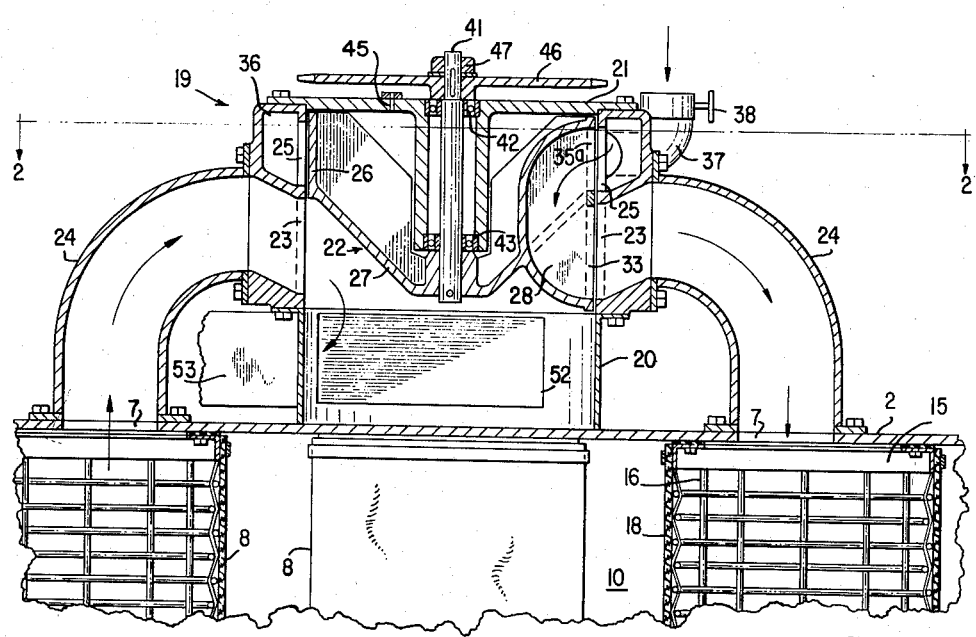
FIG. 3 is a vertical sectional view taken along the lines 3—3 of FIG. 2.
Figure 5:
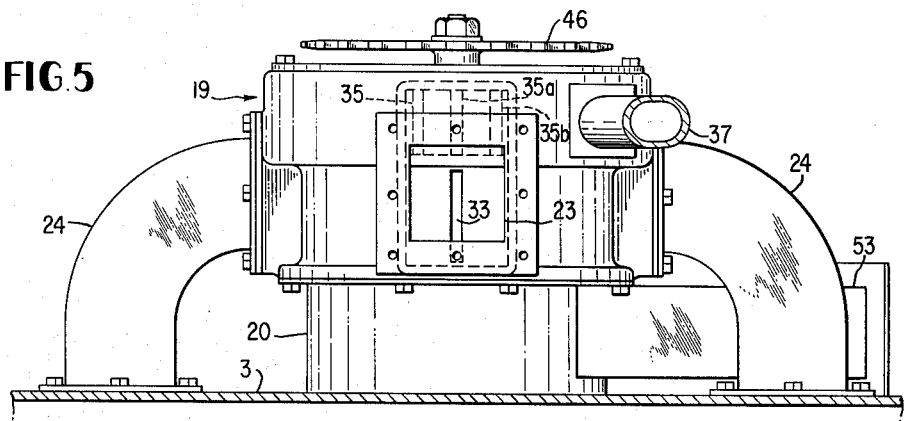
FIG. 5 is a side elevational view of the valve of the filter of FIG. 1 on an enlarged scale.

In operation, the blower or exhauster is started, and induces a stream or air to enter through the gas-material inlet 6 into the interior of the casing 2 and, after passing inwardly through the filter elements 8, to be exhausted through the outlets 7, branch ducts 24, ports 23 into the lower portion of the valve casing 20, and through the outlet 52 and the exhaust conduit 53. This is the normal flow path when the filter elements are on stream in a cleaning cycle, as indicated by the arrows at the left-hand side of FIG. 3.

A portion of the material suspended in the air stream entering the casing 2 through the inlet 6 is separated therefrom at the lower, primary, separating chamber 11 by the so-called "cyclone" action caused by the skirt 9, and falls into the conical bottom portion 4 of the casing. The partially cleaned air which passes upwardly from the chamber 11 through the skirt opening 12 to the filter chamber 10 passes through the filter sleeves 18 to the outlets 7. The dust carried by this air is filtered out by the filter sleeves 18 and accumulates as a layer upon their outer surfaces.

At predetermined intervals, or at a time determined by the increased pressure differential across the filter media caused by the dust accumulation, the gear motor 49 is set into rotation to drive the rotor 22. As the rotor delivery chamber 28 approaches one group of the casing ports 23, 25, it first closes off communication between the appropriate port 23 and the lower portion of the casing having the clean gas outlet 52, thereby isolating the associated branch duct 24 from the exhauster. The lower valve port 33, and the rotationally first upper port 35 then index with the casing ports 23 and 25, respectively, approximately simultaneously. The draft induced in the receiver casing 2 by the exhauster is therefore effective to draw clean air from the atmosphere through the valve 38, intake pipe 37, manifold 36, the upper casing port 25, the first valve port 35, delivery chamber 28, the valve port 33, wide port 23, and through the associated branch duct 24 into the interior of one of the filter elements 8 connected to that particular branch duct, as shown by the arrows at the right-hand side of FIG. 3. The backward, or reverse flow of the clean gas from the interior of the filter element outwardly therethrough to the interior of the casing flushes the accumulated dust from the outer surface of the filter sleeves.

After a brief interval the trailing edge of the first upper port 35 passes the edge of the casing port 25. This cuts off the reverse flow of air and permits the system temporarily to recover itself by reducing or eliminating the reverse air pressure differential across the filter sleeve being cleaned. After a further interval, the second upper port 35a similarly registers with the port 25 in the casing, again delivering a rush of reverse-flow air from manifold 36 through aligned ports 25, 35a, delivery chamber 28, ports 33 and 23, branch duct 24, and outlet 7 to the filter element. After a stilll further interval, the port 35a passes the port 25, and the third upper port 35b subsequently indexes with the port 25 to cause another inrush of reverse air. It should be noted that the greater width of the lower casing port 23 permits the lower rotor port 33 to communicate with the branch ducts 24 for a substantial interval of rotation, so that the actual air flow control is governed by the width of three upper ports 35, 35a and 35b and the spacing between them.

After the port 35b has passed the casing port 25, continued rotation of the valve causes communication between the next casing port 23, in the direction of rotation, and the outlet 52 to be cut off and the valve ports 35, 35a and 35b to be brought successively into alignment with the next casing port 25, with resultant cleaning of the next filter element in the same manner as the preceding filter element was cleaned. Thus cleaning of the successive filter elements continues until all of them have been adequately cleaned, when the limit switch cuts off the supply of power to the motor and stops it. Since the rotor initially was indexed so that its ports 35, 35a and 35b are intermediate the casing ports 25 when the rotor is stopped, all of the filter elements again are placed on stream in their cleaning cycles.

With this arrangement, the filter assembly is cleaned by the successive sharp impacts or "pops" of reverse air which cause a corresponding flexing of the filter medium, and therefore a simplified, effective, auxiliary agitation to aid the reverse air flow in dislodging the dust therefrom.

Various changes may be made in the details of the invention as disclosed without sacrificing the advantages thereof or departing from the scope of the appended claims.

I claim:

1. An air-material separator comprising a main casing having an inlet for air carrying suspended material and an outlet for air from which suspended material has been separated, at least one filtering unit in said casing, in the path of flow of gas from said inlet to said outlet, and including a gas-permeable filtering medium through which the air must pass during such flow, a valve casing having a first port subtending a substantial circular angle, through which air which is passed through the filter medium on the cleaning cycle is adapted to pass and a discharge outlet, a conduit connecting the outlet of the main casing with said first valve casing port, said valve casing having a second port communicating with a source of external air and subtending a circular angle substantially smaller than the circular angle subtended by said first valve casing port, a valve in said valve casing, said valve including a delivery chamber having a first port adapted to register with said first valve casing port, and a plurality of laterally-spaced second ports adapted, upon movement of the valve, successively to register with said second valve casing port, said first valve port subtending a circular angle substantially smaller than the angle subtended by said first valve casing port, and adapted to be brought into registry with said first valve casing port, the plurality of said laterally-spaced second ports of the delivery chamber being located in an area of the valve subtending a circular angle not substantially larger than that subtended by said first valve casing port, and means for moving said valve selectively (1) to bring it into a position in which it permits passage of cleaned air from said first casing port to the discharge outlet in the valve casing, and (2) to bring it to positions in which it cuts off communication between said first valve casing port and the discharge outlet of the valve casing and establishes communication through said first valve casing port, said first delivery chamber port, said delivery chamber, and successively through said second delivery chamber ports to said second valve casing port, whereby air from an external source may be passed through said main casing outlet for reverse-flow cleaning of said filter medium.

2. An air-material separator as set forth in claim 1 in which the valve casing and valve generally are cylindrical and the valve casing ports are longitudinally spaced from one another and axially aligned.

3. An air-material separator as set forth in claim 1 in which the filter unit is of generally cylindrical shape and its upper end surrounds the main casing outlet.

4. An air-material separator as set forth in claim 1 in which the main casing has a plurality of outlets, a filter unit surrounds each outlet, the valve casing is generally cylindrical and has a plurality of said first valve casing outlets, conduits connect the main casing outlet to the respective first valve casing outlets, the valve casing has a second outlet for each first outlet thereof, the valve is of the rotary type, and rotation of the valve successively brings the delivery chamber thereof to positions where its ports register with the respective sets of first and second valve casing ports.

5. An air-material separator as set forth in claim 4 which includes a manifold communicating with each of the second valve casing ports, and means for admitting air from an external source to said manifold.

References Cited in the file of this patent

UNITED STATES PATENTS

| | | |
|---|---|---|
| 2,800,976 | Pellon | July 30, 1957 |
| 2,980,207 | Allen | Apr. 18, 1961 |

FOREIGN PATENTS

| | | |
|---|---|---|
| 946,766 | Germany | Aug. 2, 1956 |